US008382944B2

(12) United States Patent
Hurst

(10) Patent No.: US 8,382,944 B2

(45) Date of Patent: Feb. 26, 2013

(54) METHOD FOR SLITTING A LABEL

(76) Inventor: Richard Francis Hurst, Vero Beach, FL (US)

( * ) Notice: Subject to any disclaimer, the term of this patent is extended or adjusted under 35 U.S.C. 154(b) by 1108 days.

(21) Appl. No.: 12/082,165

(22) Filed: Apr. 10, 2008

(65) Prior Publication Data

US 2009/0255388 A1 Oct. 15, 2009

(51) Int. Cl.
*B32B 38/10* (2006.01)

(52) U.S. Cl. ......... 156/717; 156/762; 156/921; 156/936

(58) Field of Classification Search .................. 156/716, 156/717, 761, 762, 763, 921, 936
See application file for complete search history.

(56) References Cited

U.S. PATENT DOCUMENTS 1,497,165 A * 6/1924 Bottomley ................. 15/236.01
4,122,734 A * 10/1978 Hurst ............................. 82/1.11
4,220,481 A * 9/1980 Bleiman et al. .................... 134/6
4,248,661 A * 2/1981 Bleiman et al. ............... 156/767
4,944,832 A * 7/1990 Abe et al. ....................... 156/751
5,152,865 A 10/1992 Hurst
5,679,210 A * 10/1997 Thomas ........................ 156/762
5,885,401 A * 3/1999 Eiban ............................ 156/709

FOREIGN PATENT DOCUMENTS

DE 3504303 A1 * 8/1986
JP 2001205631 A * 7/2001

* cited by examiner

*Primary Examiner* — Mark A Osele
(74) *Attorney, Agent, or Firm* — Richard M. Saccocio

(57) ABSTRACT

A method for assisting in the removal of a pressure sensitive label from a slender glass vessel wherein said label is wrapped around the circumference of the vessel and extends along the length of the vessel includes positioning a planar cutting blade at two angles relative to the label, drawing the blade down along the length of the label, cutting the label into two opposite cut edges with one edge adhering to the vessel and the other cut edge being raised slightly away from the circumference of the vessel and forming a space between the two cut edges.

5 Claims, 2 Drawing Sheets

METHOD FOR SLITTING A LABEL

BACKGROUND OF THE INVENTION

1. Field of the Invention

The present invention relates in general to the field of label removal methods and apparatus and in particular to methods and apparatus for cutting a slit in a pressure sensitive label attached to a slender glass vessel 2. Description of the Prior Art Various reasons exist to remove adhesively applied labels to glass vessels or vessels. One particular need is in the pharmacological field. Typically, pharmaceutical vessels or vessels comprise glass ampoules, syringes, and cartridges (needless syringes) that may, for example contain a single application of a medicine to be injected by a syringe into a patient. Again typically, but not necessarily, the ampoules, syringes or cartridges comprise a small diameter, slender vessel having a length relatively large as compared to the vessel diameter.

Such vessels are typically wrapped with a printed pressure sensitive label that is usually transparent and made from a plastic film. In most instances the label ends that are parallel to the axial axis of the vessel overlap each other by a relatively small amount, perhaps 10 to 20 percent of the vessel diameter. In one method to remove the pressure sensitive label, the initial step is to cut, actually slit, the label lengthwise, i.e. along the length of the vessel. The advent of a slit edge provides for a starting location to begin the process of removing the label The type of slit to be cut can vary from one that simply cuts the label in a direction perpendicular to the surface of the vessel or one that provides a space between the slit ends along the periphery of the vessel's surface. The latter type is more preferred in that a discrete edge is made available that can be advantageously used in the process of label removal.

Therefore, what is needed are methods and apparatus for slitting a pressure sensitive label that is affixed to a slender glass vessel such that the label cab be more easily and efficiently removed. The present invention is directed to the process of making a spaced slit along the length of a pressure sensitive label attached to a slender glass vessel and accordingly achieves the aforesaid goal.

The above-stated objects as well as other objects which, although not specifically stated, but are intended to be included within the scope of the present invention, are accomplished by the present invention and will become apparent from the hereinafter set forth Detailed Description of the Invention, Drawings, and the Claims appended herewith.

SUMMARY OF THE INVENTION

The present invention accomplishes the above-stated objectives as well as others, as may be determined by a fair reading and interpretation of the entire specification herein, which comprises methods and apparatus for providing a slit in a pressure sensitive label in preparation for removal of the label from a slender glass vessel.

Typically, pharmaceutical vessels or vessels comprise glass ampoules, syringes, and cartridges (needle-less syringes) that include a pressure sensitive label attached to the vessel. Again typically, the longitudinal edges of the label overlap each other by a small amount. The present method utilizes a sharp instrument that transverses the overlapped area of the label to create a slit in the label. The sharp instrument is angled in two directions such that the slit originates at a top edge of the label and somewhat tangential to the surface of the vessel at the location of the slit. As the sharp instrument traverses downward along the length of the vessel, one cut edge of the label separates from the vessel leaving a small space between it and the vessel. The label is now in a position to be completely removed from the vessel by one or more known methods, such as being peeled from the vessel.

BRIEF DESCRIPTION OF THE DRAWINGS

Various other objects, advantages, and features of the invention will become apparent to those skilled in the art from the following discussion taken in conjunction with the following drawings, in which.

DESCRIPTION OF THE PREFERRED EMBODIMENTS

Figure 1:
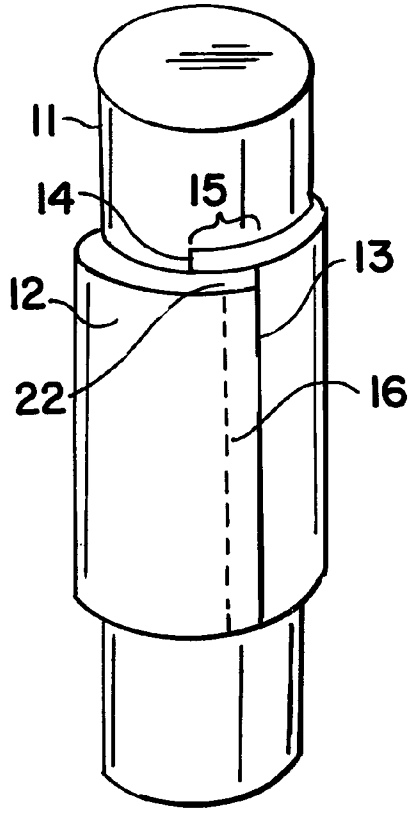
FIG. 1 is a schematic and exaggerated view of a prior art slender glass vessel having a pressure sensitive label attached thereto.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

Reference is now made to the drawings, wherein like characteristics and features of the present invention shown in the various figures are designated by the same reference numerals.

Reference is now made to FIG. 1 which illustrates a typical prior art glass vessel 11 having a pressure sensitive label 12 attached to the vessel 11. The label 12 can comprise a plastic film that is wrapped around the outer circumference of the vessel 11. In most instances, the ends 13 (outer) and 14 (inner) of the label 12 that lie along the length of the vessel 11 overlap each other by a small amount 15. There is no set amount of overlapping, but since the label 11 includes printing, the overlapped ends includes printing on only one of the overlapped ends 13 or 14. But again, this is not a fixed variable. The overlap 15 can be appreciable or minimal. Indeed, there may be no overlap such that a space exists between the ends 13 and 14 exposing a partial area of the outer circumference of the vessel 11. For purposes of the description of the preferred embodiment of the present invention, it will be assumed that an overlap 15 in the fictitious and approximate amount of 10 to 20 percent of the circumference exists. Further, for similar purposes, it will be assumed that edge 13 is the outside edge and edge 14 is the inside edge. In a preferred embodiment, the point 22 represents the location that the slit is to begin. The dashed longitudinal line 16 represents the line along which the slit is to be made.

The position of the vessel 11 in FIG. 1, that is up-right, is a preferred position to fixture the vessel in advance of the slitting operation; however a horizontal position of the vessel can also be used. Any commonly known fixture can be used for this purpose. For example, a base of the fixture can be provided with a blind opening having the diameter of the vessel. An upper part of the fixture can comprise a cap that is spring loaded so as to apply pressure to the top of the vessel 11 and capture it within the fixture. Another example of a known fixture can be similar to battery cradle in an electronic device where the battery lies in a semicircular groove that is spring loaded at one end. In this example, the vessel would be similarly cradled in a semicircular groove and held by a clamp to prevent rotation during the slitting process. Other fixturing methods can be readily envisioned by one of ordinary skill.

Figure 2:
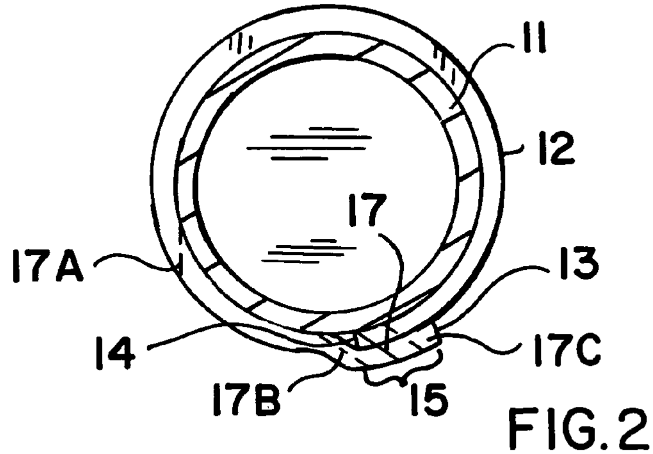
FIG. 2 is a top plan view of the prior art vessel of FIG. 1 illustrating the preferred locations to begin the slit in the label and the preferred direction of the slit.

FIG. 2 illustrates an enlarged cross sectional view of the vessel 11 and the label 12 wrapped around the circumference of the vessel 11. The overlap is seen as the area bounded by reference numeral 15. For descriptive purposes, the slit 16 will be made along the line 17. In this manner, the slit 17 will penetrate through the overlap 15. Alternatively, the slit can be made at locations 17A, 17B, 17C, or any other location across the label 12. Or. slit 17 can be made in a direction 180 degrees opposite of the slit locations shown in FIG. 2. The object being to provide a slit 16 across the overlapped ends 13 and 14 in a direction that ranges from being tangential to the circumference of the vessel 12 to an angle of approximately twenty degrees away from the tangential. In testing, it has been shown that a slit angled and separated from the opposite cut end 27 as stated provides sufficient separation of the cut end 26 so as to provide sufficient subsequent gripping of the cut end 26 to accomplish the subsequent label 11 removal. The invention is however not to be limited to the stated preferred embodiment. So long as some separation of cut end 26 occurs, the subsequent process of label removal can be adequately accomplished.

Figure 3:
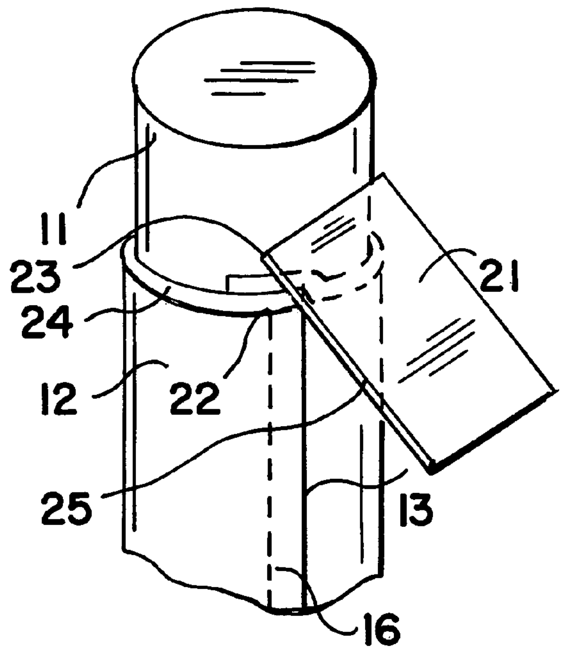
FIG. 3 is a schematic, isometric view of an initial position of a sharp instrument relative to the overlapped portion of the label to be slit.
Figure 5:
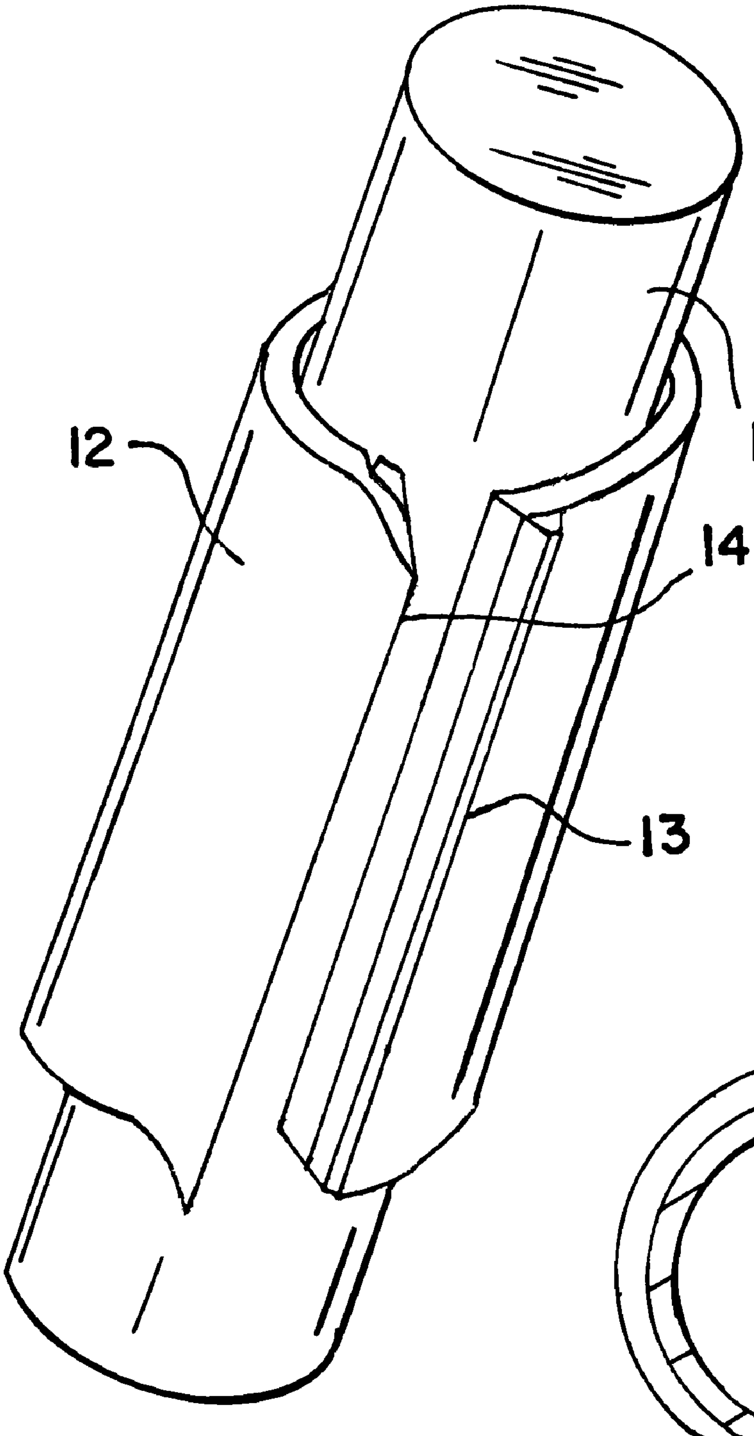
FIG. 5 is an isometric view of the slit created by the method of the present invention.
Figure 4:
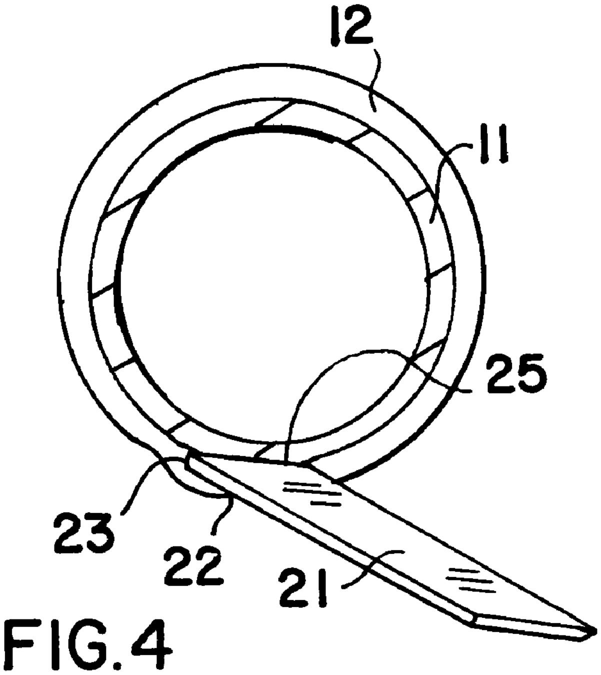
FIG. 4 is a top plan view of FIG. 3 illustrating the second angle of the sharp instrument in accordance with the inventive method.

FIG. 3 schematically illustrates the initiation of the slit 16 along the line 17 using a sharp blade 21. The initial point of contact of the blade 21 with the label 12 is at point 22 which is located at the top of the label 12 at the top of the slit line 16 as also seen in FIG. 1. Thus, at the initiation of the slitting process, the top cutting edge 23 of blade 21 is positioned above the top edge 24 of label 12 with the top cutting edge 23 being positioned against the periphery or outer circumference of the vessel 11. Such positioning results in the cutting edge 25 of blade 21 being angled downward and outward away from the circumference of the vessel 11. Such positioning also results in the plane of the blade 21 being angled away from the line 17 of the slit 16. It is this double angularity that results in the slit 16 being separated or the ends 26 and 27 being spaced apart as seen in FIG. 5. The angularity of the cutting edge 25 of blade 21 is seen in FIG. 3. The angularity of the plane of the blade 21 relative to the angle 17 of the slit 16 is seen in FIG. 4.

With the blade 21 being maintained in the aforesaid position, the blade is brought downward in a straight line, along the length of slit line 16. As the blade 21 so progresses, the cut end 26 of label 12, together with a portion of the inner overlapped end of label 12 is gently but firmly directed outward away from the circumference or outer surface of vessel 11 (due to the above described double angle of blade 21) as schematically shown in cross section in FIG. 5. When the blade 21 completely traverses the slit line 16, the cut end 26 of label 12 is located away from the vessel 11 along the entire length of slit line 16. It is now extremely more convenient to use the cut end 26 of label 12 to continue the label removal process The above described slitting operation can be accomplished by hand using a fixture as above described to hold the vessel 11. Or, the blade 21 can affixed to, for example a plate attached to a linear motion bearing such that it can be pivoted away from the vessel fixture to allow loading of a vessel and pivoted back toward the vessel in the preferred cutting position and then either mechanically or by hand drawn along the slit line 16.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim:

1. A method for assisting in the removal of a pressure sensitive label from a glass vessel wherein said label is wrapped around the circumference of the vessel and extends along the length of the vessel, including the steps of fixturing the glass vessel to prevent subsequent movement of the same while exposing a portion of the circumference of the label along the entire length of the label, positioning a planar cutting blade at two angles relative to the exposed portion of the label, one of said angles being such that a topmost cutting end lies against the vessel and slightly above an uppermost end of the label and a linear cutting edge of the blade below the topmost cutting end is directed outward and away from the circumference of the vessel, said second angle being such that the plane of the cutting blade forms an angle with a straight line extending the length of the label, and drawing said cutting edge of the blade down the length of the label and along said straight line with which said second angle is formed and cutting an angled slit through the thickness of the label along the length of said label and such that an outer edge of the cut angled slit is forced away from the circumference of the bottle.

2. The method of claim 1 including the step of positioning the plane of the cutting blade forming said second angle such that said plane is approximately tangential to said vessel at the line extending the length of the vessel.

3. The method of claim 1 including the step of forming a slight separation between opposite ends of said angled slit along the length of said label.

4. A method for slitting a pressure sensitive label attached to a slender glass vessel comprising the steps of:

fixturing the glass vessel to prevent subsequent movement of the same while exposing a portion of the circumference of the label along the entire length of the label, positioning a planar cutting blade having a straight cutting edge such that a topmost cutting end lies against the vessel slightly above the uppermost end of the label and a slightly lower cutting edge lies against an outer circumference of the label at the uppermost end of the label, said blade cutting edge being approximately tangential to said vessel, drawing said cutting blade down a line along the length of said label thereby slitting said label along said line into two adjacent cut edges , and forming a slight separation between said cut edges of said label.

5. A method for slitting a pressure sensitive label attached to a slender glass vessel comprising the steps of:

fixturing the glass vessel to prevent subsequent movement of the same while exposing a portion of the circumference of the label along the entire length of the label, positioning a planar cutting blade having a straight cutting edge such that a topmost cutting end lies against the vessel slightly above the uppermost end of the label and a slightly lower cutting edge lies against an outer circumference of the label at the uppermost end of the label, said blade cutting edge being approximately tangential to said vessel, and drawing said cutting blade down a line along the length of said label and cutting the label along said line into two opposite cut edges with one cut edge adhering to the vessel and the other cut edge being raised slightly away from the circumference of the vessel and forming a space between the two cut edges.

* * * * *